March 4, 1952  C. O. SMITH  2,588,300
ARTIFICIAL FISHING BAIT
Filed Aug. 4, 1949
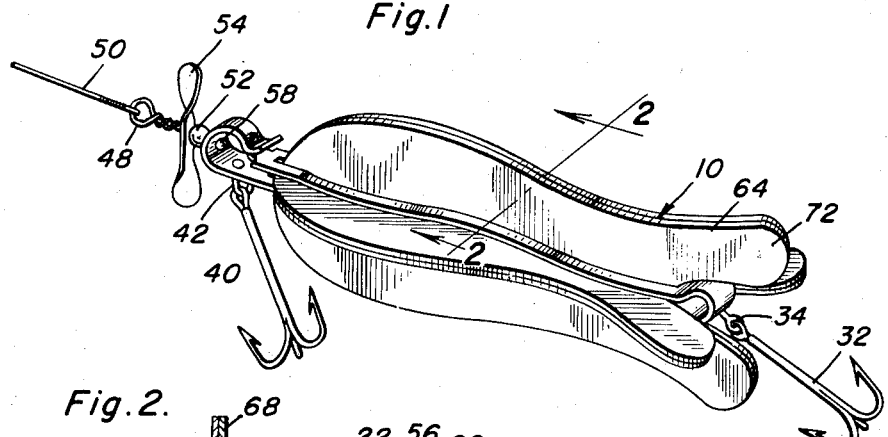
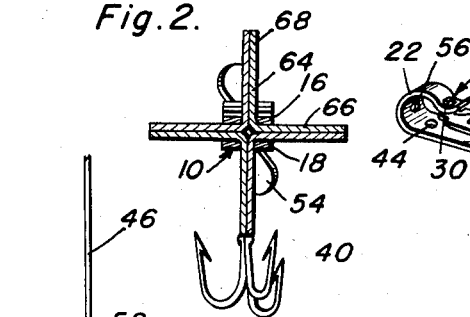
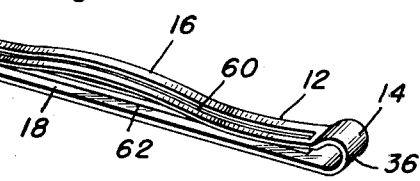
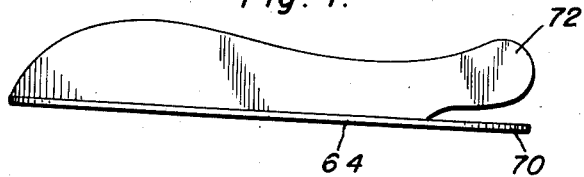
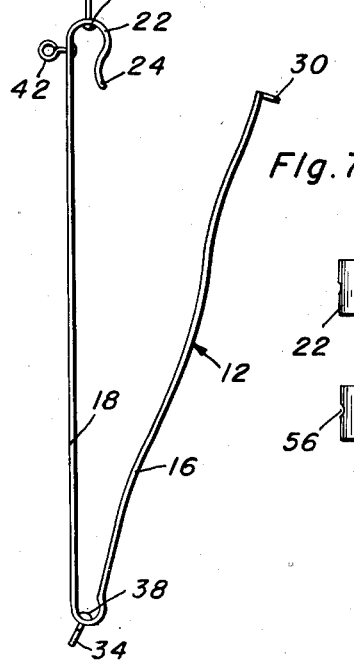
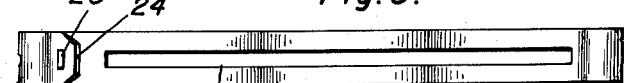
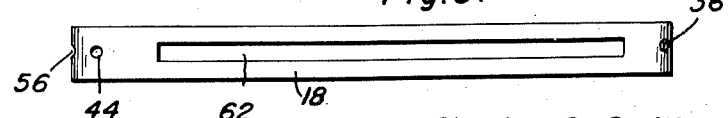
Charles O. Smith
INVENTOR.

Patented Mar. 4, 1952

2,588,300

UNITED STATES PATENT OFFICE 2,588,300

ARTIFICIAL FISHING BAIT

Charles O. Smith, Kansas City, Mo.

Application August 4, 1949, Serial No. 108,534

10 Claims. (Cl. 43—42.09)

This invention appertains to an artificial fish bait and has for its primary object to simulate a live minnow and, when in use, to reproduce the natural movements of a live minnow.

Another important object of this invention is to provide an artificial bait or lure which is simply and durably constructed and which consists of a comparatively rigid holder adapted to retain a plurality of thin, flexible tabs which are shaped to simulate small minnows.

A further object of this invention is to provide a more attractive and natural artificial bait which consists of a plurality of spaced complementary flexible tabs, which may be variously colored to produce various light effects in the water.

These and ancillary objects and structural features of merit are attained by this invention, the preferred embodiment of which is set forth in the following description and illustrated in the accompanying drawings, wherein:

Figure 1 is a view in perspective of the artificial fish bait, constructed in accordance with the principles of this invention;

Figure 2 is a transverse sectional view taken on line 2—2 of Figure 1;

Figure 3 is a view in perspective of the body member or holder;

Figure 4 is a view in perspective of one of the flexible tabs;

Figure 5 is a top plan view of the lower section of the holder;

Figure 6 is a bottom plan view of the lower section of the holder; and

Figure 7 is a side elevational view of the holder, illustrating the same in an open position.

Referring now more particularly to the accompanying drawings, the artificial bait 10 includes a body member or holder 12 which is formed from a single piece of comparatively rigid but somewhat resilient material and which is bent upon itself, as at 14, to form a closed end and to define two complementary sections 16 and 18. The lower section 18 is flat and the upper section 16 is centrally bulged upwardly, the sections being disposed in substantial parallelism.

Means is provided for detachably securing the unattached ends of the sections together, and preferably include a clasp connection 20, wherein the end 22 of the lower section 18 is curved upwardly and inwardly and terminates in an upwardly extending tongue 24. The tongue 24 is formed with a vertical opening 26, adjacent the inner end thereof and the end 28 of the upper section 16 is formed with an upwardly extending lug 30 adapted to lock in the opening 26.

A hook member 32 is swivelly attached to the closed end 14 of the holder by means of an eyelet 34, the shank of which is inserted through an opening 36 in the closed end and is peened over as at 38. In a similar manner, a hook member 40 of any general type is swivelly attached by means of an eyelet 42 to the unattached end of the lower section, the eyelet being inserted through an opening 44 in the lower section.

A shank 46, which is made of a small wire or rod, is formed at its outer end with an eyelet 48 to which is secured one end of a regular fishing line 50. The shank is reversely bent at its outer end to form the eye or loop 48, the reversely bent portion of the shank extending along the main portion. A bead 52 is concentrically disposed on the shank, adjacent the curved end of the lower section, and spaces a spinner 54, rotatably disposed on the shank, from the holder. The shank is inserted through an opening 56 in the curved end of the lower section and is peened over, as at 58.

Both of the sections are formed with longitudinally disposed, vertically aligned slots 60 and 62. Thin, flexible tabs 64 are provided and are configured to conform substantially to the configuration of a minnow. The tabs are bent longitudinally at their center to form two sections 66 and 68 disposed at right angles to each other.

The fish-shaped tabs are formed with diverging tapering fins or portions 70 and 72 at one end, so that when the tabs are inserted within the upper and lower sections of the holder, as seen in Figure 2, the ends 70 and 72 project beyond the closed end 14 of the holder, as seen in Figure 1. It is to be noted, with respect to Figure 2, that the tabs are inserted in the holder at right angles to each other, the section 68 of the tabs extending through the notch 60 or 62 and the section 66 projecting laterally from between the upper and lower sections. The tabs are clamped in the holder by securing the two sections together by means of the clasp connection 20 and they project laterally from the holder and are coextensive therewith, so that when the same is in the water, the water passes between the tabs and holds the tabs substantially in the position shown in Figure 2. The water also causes the holder to rotate, when it strikes against the tabs, and causes the same to wiggle and dodge, and otherwise simulate the natural actions of a live minnow.

It can thus be seen that there has been provided a simple and efficient artificial bait or lure, which can be inexpensively manufactured and used.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An artificial fish bait comprising an elongated body member and a plurality of elongated back to back pairs of flexible tabs extending throughout the length of said member and secured to and projecting laterally therefrom.

2. An artificial fish bait comprising an elongated body member and a plurality of elongated back to back pairs of flexible tabs secured to said member, said tabs extending parallel with the axis of the member substantially the length of the member and projecting laterally therefrom in spaced fashion.

3. An artificial fish bait comprising an elongated body member having longitudinal slots therein, a pair of back to back flexible angled tabs disposed in each of said slots and means for clamping the tabs within the slots.

4. An artificial fish bait comprising a clamping member and a plurality of flexible tabs supported by said member and projecting laterally at right angles from said member, said tabs being disposed coextensive with said member throughout their length.

5. An artificial fish bait comprising a body member including a pair of complementary sections, means for clamping the sections together and a plurality of juxtapositioned flexible thin tabs secured between said sections and extending laterally therefrom.

6. An artificial fish bait comprising a pair of clamping members, means for detachably securing the members together, each of said members being formed with aligned longitudinally extending slots, a pair of longitudinally angled back to back flexible tabs disposed in each of said slots and clamped between the members.

7. An artificial fish bait comprising a pair of clamping members, means for detachably securing the members together, each of said members being formed with aligned longitudinally extending slots, a pair of longitudinally angled back to back flexible tabs disposed in each of said slots and clamped between the members, said tabs extending laterally from the members and disposed at right angles to each other.

8. An artificial bait comprising an upper pair of elongated angle members each having an upstanding vertical flange and a horizontal flange, a lower pair of elongated angle members each having a depending vertical flange and a horizontal flange, the vertical flanges of said upper pair of members being in back to back relation and the vertical flanges of said lower pair of members also being in back to back relation, the horizontal flanges of said upper pair of members being in back to back relation with the horizontal flanges of said lower pair of members, and means retaining all of said members in assembled relationship.

9. An artificial bait comprising an upper pair of elongated angle members each having an upstanding vertical flange and a horizontal flange, a lower pair of elongated angle members each having a depending vertical flange and a horizontal flange, the vertical flanges of said upper pair of members being in back to back relation and the vertical flanges of said lower pair of members also being in back to back relation, the horizontal flanges of said upper pair of members being in back to back relation with the horizontal flanges of said lower pair of members, and an elongated clamping member having upper and lower leg portions, each of said leg portions having an elongated slot therein, the vertical flanges of said upper pair of members extending through the slot in said upper leg portion, and the vertical flanges of said lower pair of members extending through the slot in said lower leg portion.

10. An artificial bait comprising an upper pair of elongated angle members each having an upstanding vertical flange and a horizontal flange, a lower pair of elongated angle members each having a depending vertical flange and a horizontal flange, the vertical flanges of said upper pair of members being in back to back relation and the vertical flanges of said lower pair of members also being in back to back relation, the horizontal flanges of said upper pair of members being in back to back relation with the horizontal flanges of said lower pair of members, and means retaining all of said members in assembled relationship, said angle members being of thin flexible material.

CHARLES O. SMITH.

REFERENCES CITED

The following references are of record in the file of this patent:

UNITED STATES PATENTS

| Number | Name | Date |
| --- | --- | --- |
| 213,595 | Thorp | Mar. 25, 1879 |
| 817,257 | Lee | Apr. 10, 1906 |
| 1,072,903 | Bippart | Sept. 9, 1913 |
| 1,235,331 | Kuroki | July 31, 1917 |
| 1,476,139 | Bingham | Dec. 4, 1923 |
| 1,519,174 | Tomlin | Dec. 16, 1924 |
| 1,783,049 | Milks | Nov. 25, 1930 |
| 1,986,282 | Parker | Jan. 1, 1935 |
| 1,990,467 | Blustein | Feb. 12, 1935 |